May 24, 1927.
E. J. ROHNE
1,629,737
ELECTRIC FRYING PAN
Filed March 23, 1922
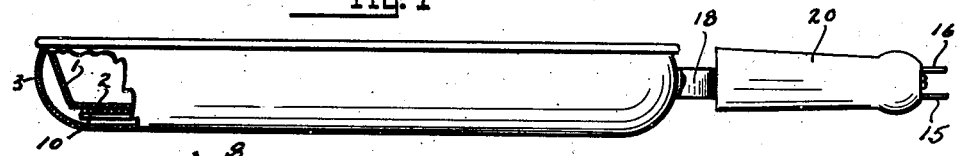
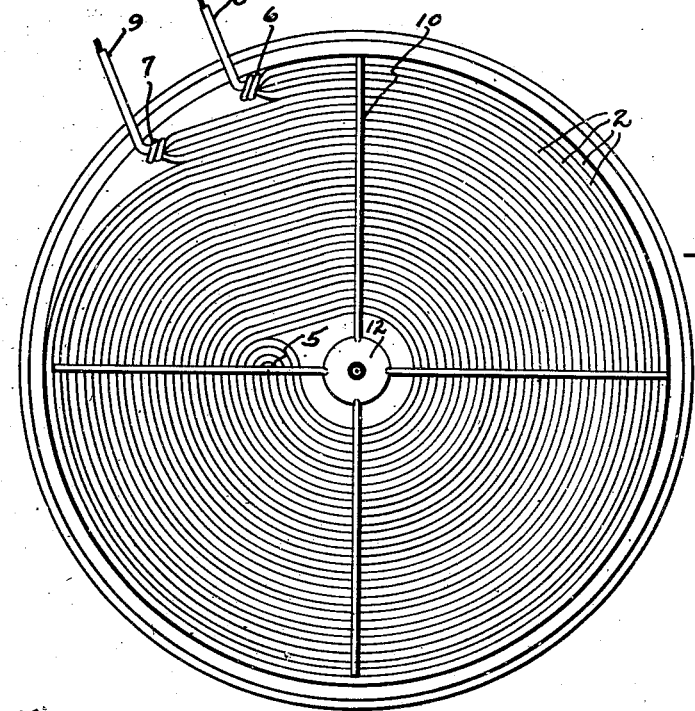
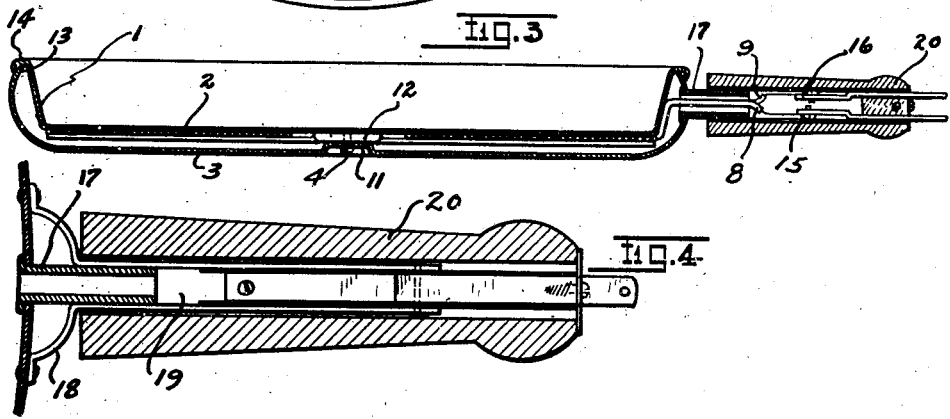
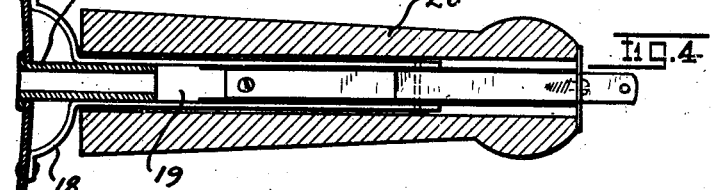
INVENTOR
EVEN J ROHNE
BY C.D.Enochs
ATTORNEY Patented May 24, 1927.

1,629,737

UNITED STATES PATENT OFFICE.

EVEN J. ROHNE, OF MINNEAPOLIS, MINNESOTA.

ELECTRIC FRYING PAN.

Application filed March 23, 1922. Serial No. 546,062.

The main object of my invention is to provide an electric frying pan of such character that the bottom thereof will be heated uniformly throughout substantially its entire area.

Another object is to provide in an electric frying pan a simple and inexpensive heating element that may be readily exposed and repaired.

Another object is to provide improved means for bringing the connections from the heating element to a suitable plug where they may be connected to the ordinary electrical cord plug switch device.

Another object is to provide a simplified means for preventing injury to the heating element.

With these and incidental objects in view, the invention consists of certain novel features of construction and combination of parts, the essential elements of which are hereinafter described with reference to the drawing which accompanies and forms a part of this specification.

In the drawing Figure 1 is a side elevation of my improved electric frying pan with a fragment thereof broken away, Figure 2 is a bottom view of the frying pan with the false bottom removed, Figure 3 is a section taken through the axis of the connecting plug and in a plane at right angles to the surface of the frying pan, and Figure 4 is an enlarged detail of the connecting plug.

As shown in Figures 1, 2 and 3 the electric frying pan consists of a pan 1 having a heating element 2 on the bottom thereof enclosed with the false bottom 3, the screw 4 joining the pan with the false bottom.

The heating element is formed by taking four suitable conductors, looping them at 5, Figure 2, and winding them spirally around the bottom of the pan in one plane. One set of four ends are electrically joined at 6 and the other set at 7, and the connections therefrom brought out at 8 and 9 respectively.

The bottom of the pan 1 is preferably first covered with a coating of cement, the heating element placed thereon and then coated with a suitable cement, the cement firmly joining the heating element to the bottom surface of the pan.

A cross 10 preferably formed of heavy wires covered with a coating of cement serves to hold the heating element in position and also serves as a protection for the conductors of the element againt injury if the false bottom should become battered.

The pan 1 and the false bottom 3 are spaced one from another by the joining with the screw 4 of the depressed portion 11 of the false bottom and the disk 12 carried by the bottom of the pan 1, the perimeter of the false bottom at 13 nesting into the outturned flange 14 of the pan 1.

The conductors 8 and 9 are brought to the clips 15 and 16 respectively and suitably fastened thereto, and the opposite ends of these clips are adapted to receive thereon the end of a plug switch.

A hollow stud 17 suitably joined to the false bottom 3 and braced by the legs 18 carries the insulating block 19 on which the clips 16 and 17 are mounted.

A handle 20 of wood or any other suitable material serves to cover the electrical connections and also as the ordinary handle for the completed frying pan.

The construction of my electric frying pan is of such nature that the pan is of substantially the same dimensions and weight as the ordinary pan without the heating element.

While I have described my invention and illustrated it in one particular design, I do not wish it understood that I limit myself to this construction, as it is evident that the application of the invention may be varied in many ways within the scope of the following claims:

1. In an electric frying pan the combination of a pan element having an electric heating element joined to the bottom surface thereof, a removable false bottom joined to said pan element, a hollow stud projecting from said false bottom through which electric conductors are led from said heating element, diametrically opposed legs extending from said false bottom and supporting said stud, an insulating block carried by said legs and connecting clips carried by said insulating block.

2. In an electric frying pan the combination of a pan element, a false bottom detachably joined thereto, a plurality of heating conductors spiraled in one plane upon the bottom surface of said pan, a wire cross positioned below said heating element, and means for spacing said false bottom from said heating element.

3. In a device of the class described the combination with a heating element, an inclosure surrounding said heating element, a hollow stud projecting from said inclosure through which electrical conductors are led from said heating element, supporting legs extending from said inclosure and supporting said stud, an insulating block carried by said legs, connecting clips carried by said insulating block, and an inclosing handle covering said insulating block and clips.

EVEN J. ROHNE.